Figure 1:
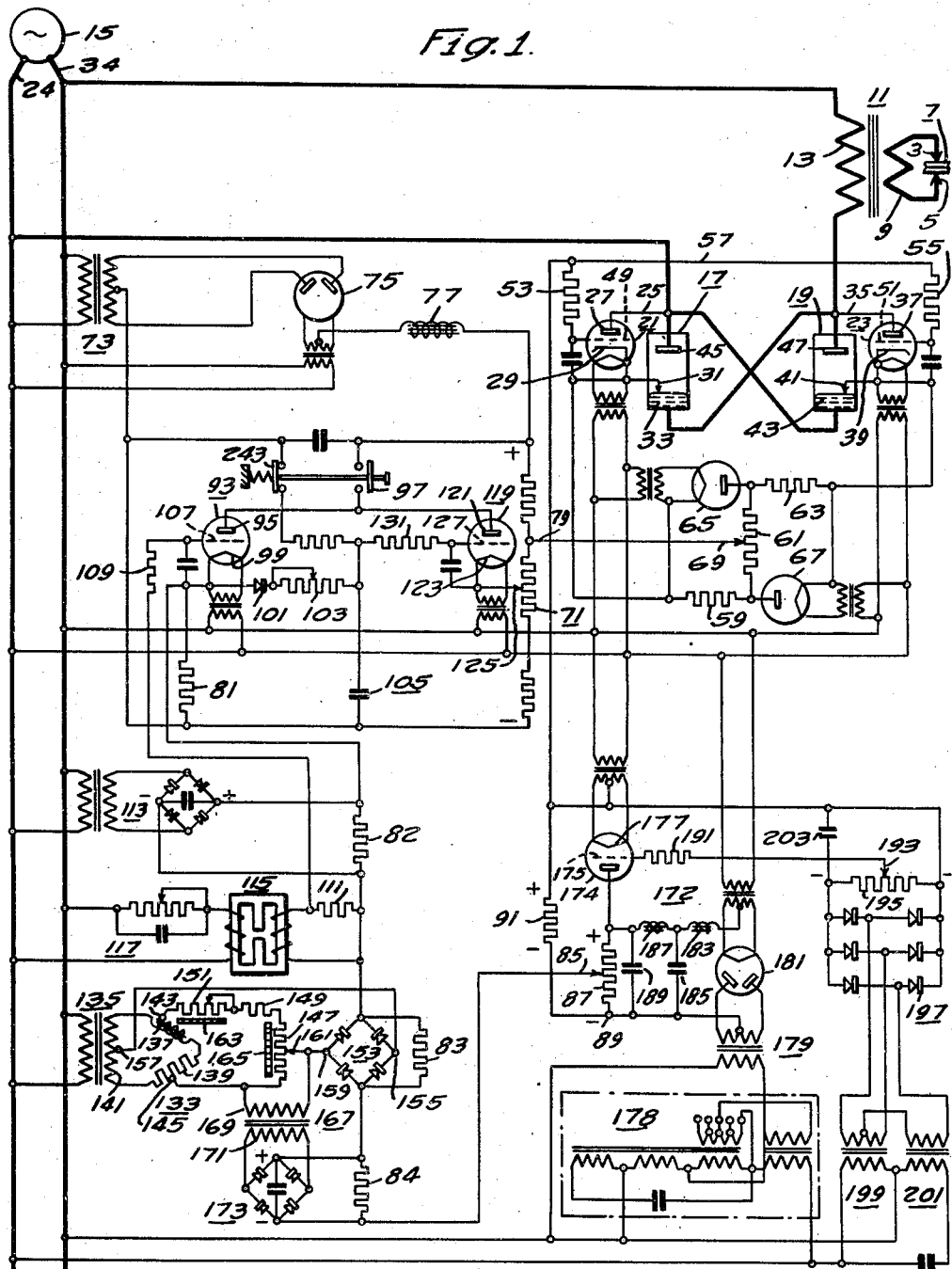

Aug. 27, 1946.                J. R. MAHONEY                2,406,429
                          ELECTRONIC CONTROL SYSTEM
                          Filed Nov. 20, 1943          2 Sheets-Sheet 1

WITNESSES:                                          INVENTOR
                                                 John R. Mahoney.
                                             BY
                                                    F. W. Lyle.
                                                    ATTORNEY Aug. 27, 1946.   J. R. MAHONEY   2,406,429
ELECTRONIC CONTROL SYSTEM
Filed Nov. 20, 1943   2 Sheets-Sheet 2
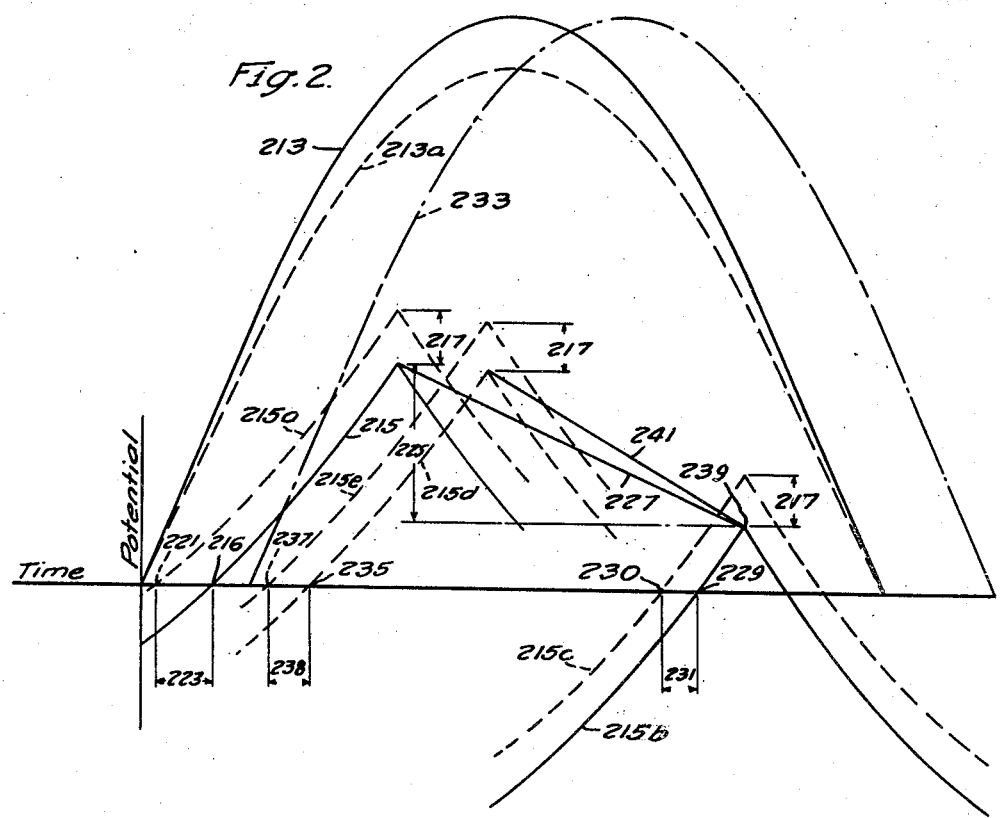
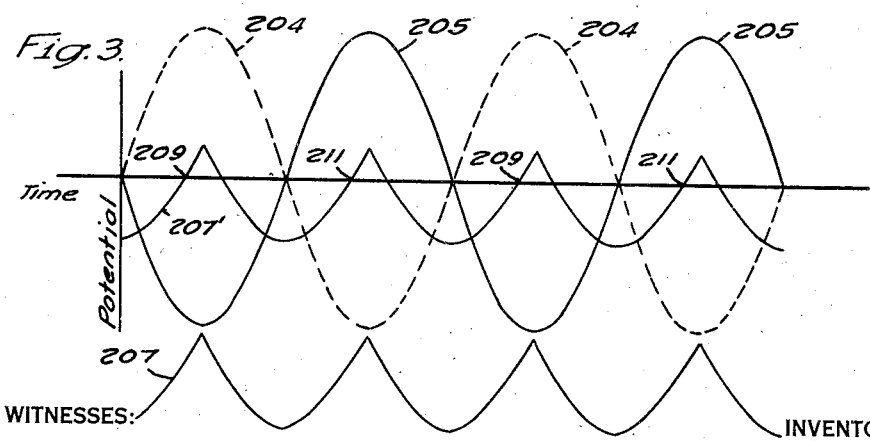
WITNESSES:
INVENTOR
John R. Mahoney.
BY
ATTORNEY Patented Aug. 27, 1946

2,406,429

UNITED STATES PATENT OFFICE 2,406,429

ELECTRONIC CONTROL SYSTEM

John R. Mahoney, Pittsburgh, Pa., assignor to Westinghouse Electric Corporation, East Pittsburgh, Pa., a corporation of Pennsylvania Application November 20, 1943, Serial No. 511,087

10 Claims. (Cl. 171—119)

This invention relates to an electronic control system and has particular relation to a system such as is employed in resistance welding in which current is supplied from an alternating potential source to a load under the control of electric discharge valves.

In resistance welding apparatus constructed in accordance with the teachings of the prior art, a pair of inversely connected ignitrons are interposed between an alternating-current source and the welding transformer for controlling the flow of current to the transformer. For each weld the ignitrons are rendered conductive alternately in successive half periods of the source by suitable control circuits during a predetermined interval of time which is measured in terms of half periods of the source. To control the amount of energy supplied to the welding transformer and thus to control the welding heat, the control circuits are arranged to cause each ignitron to become conductive at an instant in a half period preselected by the operator in accordance with the requirements of the material to be welded. In this manner, a preselected number of spaced current impulses is supplied to the welding transformer.

It is well known that in many welding operations, the maintenance of a proper welding heat is essential. If too much heat is provided, the material is burned. On the other hand, if too little heat is provided, the material is not properly fused. However, in the usual power system employed for resistance welding, the effective value of the source potential is subject to numerous fluctuations as the result of such conditions as a widely varying load or a lack of capacity of the system. It is apparent that when the effective value of the source potential decreases, the effective value of the current conducted to the transformer and, therefore, the welding heat, decreases. Conversely, when the source potential increases, the welding heat increases. It follows that to maintain the welding heat substantially constant, it is necessary to compensate for fluctuations in the source potential.

Since changes or fluctuations of the source potential may occur with considerable rapidity, it is impossible to compensate for the fluctuations by manual adjustment of the control circuits. In the copending application of Clyde E. Smith Serial No. 443,937, filed May 21, 1942, and assigned to the assignee of the present invention, which application issued as United States Patent No. 2,374,044 on April 17, 1945, is described a control circuit which includes means for compensating for fluctuations in the source potential. In the Smith circuit, the welding current is controlled by a pair of inversely connected ignitrons which are rendered conductive alternately in successive half-periods of the source at an instant in each half-period, known as the firing point, selected according to the welding heat desired. To compensate for fluctuations in the effective value of the source potential, the control means for the ignitrons includes means responsive to the source potential to advance the firing point of the ignitrons for a decrease in the source potential to supply current over a greater portion of a half-period and thereby to avoid the corresponding decrease in welding heat. For increases in the effective value of the source potential, the firing point is, of course, delayed. In any case, the amount of variation in the position of the firing point depends upon the amount of variation in the source potential.

The Smith apparatus operates quite satisfactorily to maintain the welding heat within limits suitable for many welding operations even though the source potential may fluctuate. However, it has been found that the limits are not sufficiently close for some of the welding operations which require extremely accurate heat control.

It is, accordingly, an object of my invention to provide a new and improved control system for resistance welding apparatus in which the welding heat is maintained within narrow limits even though the effective value of the source potential may fluctuate.

More generally, it is an object of my invention to provide an improved apparatus for supplying a preselected number of spaced current impulses from a source of potential to a load in which variations in the effective value of the current supplied in response to variations in the effective value of the source potential is avoided.

Another object of my invention is to provide apparatus for supplying spaced current impulses from a source of alternating potential to a load in which a predetermined amount of energy is supplied to the load by each of the impulses regardless of fluctuations in the effective value of the source potential.

My invention arises from a realization that the amount of compensation in the nature of a variation or shifting of the firing point of the ignitrons which is necessary for a given variation in the effective value of the source potential, differs for different heat settings and differs for the same heat setting with different power factor conditions. That this is true may be understood from a consideration of the operation of the supply circuit under different conditions. For a low heat, an ignitron is fired late in a half-period of the source potential. A drop in the effective value of the source potential then requires an advancing of the firing point by a certain amount to increase the effective value of the current supplied and thereby maintain the heat constant.

For a high heat, an ignitron is fired early in a half-period. However, with the source potential having the usual sinusoidal wave form, a drop in the effective value of the source potential requires an advancing of the firing point by an amount greater than that required under low heat conditions to maintain the heat constant. For example, with a 20% heat setting, a 10% decrease in source potential causes a 10% decrease in current supplied which amounts to a 2% decrease in current with respect to the maximum steady state current at 100% heat setting and the original source potential. Likewise with a 50% heat setting, a 10% decrease in source potential causes a 10% decrease in current supplied but the decrease amounts to a 5% decrease in current with respect to the maximum steady state current at 100% heat setting and the original source potential. To compensate for a 5% decrease requires an advancing of the firing point by a greater amount than that necessary to compensate for a 2% decrease.

I have also found that it is necessary to consider the power factor of the load in determining the amount of compensation necessary. For a 100% power factor and an 80% heat setting, an ignitron is rendered conductive at a given instant in a half-period of the source potential. However, for a different power factor, such as a 75% power factor, and the same 80% heat setting, an ignitron is rendered conductive at a different instant later in a half-period of the source potential to deliver 80% of the available current. However, for a 20% heat setting an ignitron must be rendered conductive at approximately the same instant in a half-period with any power factor under which the usual welding apparatus is operated. It follows that the possible firing point positions over the entire range of heat control settings from 100% heat to 20% heat includes a smaller portion of a half-period for a low power factor than for a high power factor. Consequently, the ratio of the variation of the instant of firing of the ignitrons for compensation to the source potential variation must not only increase for adjustments of the heat control selecting means from a setting for an instant late in a half-period toward a setting for an instant early in a half-period, but, in addition, the rate of increase must be adjusted to be greater for loads having lower power factors than for loads having higher power factors.

In accordance with my invention, each ignitron is rendered conductive while its anode is positive, when a control potential in a control circuit becomes more positive than a predetermined critical potential. The control potential comprises a first periodically pulsating potential having a preselected phase displacement relative to the source potential, each of the pulsations of said first potential having a sloping wave front with a slope which is non-uniform over the length of said front, a second direct-current potential of a magnitude depending upon both the particular phase displacement selected and the power factor, and a third direct-current potential which varies in magnitude in accordance with variations in the effective value of the source potential. Thus, the ratio of the variation of the instant in a half-period in which an ignitron becomes conductive to the source potential variation is varied in accordance with the adjustment of the phase preselecting means with the ratio increasing for adjustments of the phase preselecting means from a setting for an instant late in a half-period toward a setting for an instant early in a half-period and with the rate of increase adjusted in accordance with the power factor of the load.

The novel features that I consider characteristic of my invention are set forth with particularity in the claims, the invention itself, however, both as to its organization and its method of operation, together with additional objects and advantages thereof, will best be understood from the following description of a specific embodiment when read in connection with the accompanying drawings, in which:

Figure 1 is a schematic diagram illustrating a specific embodiment of my invention; and Figs. 2 and 3 are curves illustrating the operation of the circuit of Fig. 1.

In the apparatus as shown in the drawings, a pair of welding electrodes 3 and 5 engage the material 7 to be welded and are connected across the secondary 9 of a welding transformer 11. The primary 13 of the welding transformer is supplied with power from a source of alternating current potential 15 through a pair of inversely-connected ignitrons 17 and 19. A pair of electric discharge devices 21 and 23, preferably thyratrons, which are hereinafter designated as firing valves, are arranged to control the ignition of the ignitrons 17 and 19, respectively. The ignition circuit for one of the ignitrons 17 extends from one side 24 of the source 15 through a conductor 25, the anode 27 and cathode 29 of the firing valve 21, the igniter 31 and cathode 33 of the ignitron 17 and the primary 13 of the welding transformer to the other side 34 of the source 15. The ignition circuit of the other ignitron 19 may be traced from the other side 34 of the source 15 through the primary 13 of the welding transformer, a conductor 35, the anode 37 and cathode 39 of the firing valve 23, the igniter 41 and cathode 43 of the ignitron 19 to side 24 of the source 15.

It is to be noted that the anode 27 of firing valve 21 is always of the same polarity as the anode 45 of the corresponding ignitron 17, and the anode 37 of firing valve 23 is of the same polarity as the anode 47 of ignitron 19. Thus, when a firing valve becomes conductive, ignition of the corresponding ignitron is effected. When an ignitron becomes conductive, the ignition circuit through the corresponding firing valve is short-circuited by the discharge path through the ignitron, and the firing valve is rendered non-conductive. The ignitron then becomes non-conductive at the end of the half-period of the source potential in which it was ignited.

The control electrodes 49 and 51 of the firing valves 21 and 23 are interconnected through their corresponding grid resistors 53 and 55 and conductor 57. The cathodes 29 and 39 of the firing valves are also interconnected through three resistors 59, 61, 63. A gaseous discharge rectifier tube 65 is connected across the first and second resistors 59 and 61 and a second gaseous discharge rectifier tube 67 is connected across the second and third resistors 61 and 63. The first rectifier tube 65 is arranged to conduct current away from the junction point of the first and second resistors 59 and 61 and the second rectifier tube 67 is arranged to conduct current away from the junction point of the second and third resistors 61 and 63. This arrangement is more particularly described in the copending application of Donald P. Faulk, Serial No. 463,989, filed October 30, 1942, and assigned to the assignee of the present invention, which application issued as United States Patent No. 2,363,305 on November 21, 1944. As will be explained hereinafter, a control potential is impressed between the control electrodes 49 and 51 of the firing valves and a center tap 69 on the second resistor 61 to control the conductivity of the ignitrons. The three resistors 59, 61 and 63 interconnecting the cathodes 29 and 39 of the firing valves are also connected across the source 15 through the igniters 31 and 41 and cathodes 33 and 43 of the ignitrons 17 and 19. Consequently, an alternating potential in phase with the source appears across these resistors. When the potential across the resistors 59, 61 and 63 is of such polarity that the cathode connected end of the first resistor 59 is negative, meaning that the anode 27 of firing valve 21 is positive, the first rectifier 65 becomes conductive to short-circuit the first and second resistors 59 and 61. It follows that the control potential impressed between the control electrodes 49 and 51 of the firing valves and the center tap 69 of the second resistor 61 is then effectively impressed directly between the control electrode 49 and cathode 29 of the firing valve 21. Similarly, when the cathode connected end of the third resistor 63 is negative, meaning that the anode 37 of firing valve 23 is positive, the second rectifier 67 becomes conductive to short-circuit the second and third resistors 61 and 63 and the control potential is effectively impressed between the control electrode 51 and cathode 39 of the second firing valve 23. Interference with the shape of the wave form of the control potential by the alternating potential across the three resistors is thus avoided.

The remainder of the circuit shown in Fig. 1 is arranged to produce the control potential and includes a voltage divider 71 energized from the source 15 through an auxiliary transformer 73, a full wave rectifier 75 and filtering elements 77. An intermediate tap 79 on the divider 71 is connected to the center tap 69 on the second resistor 61 interconnecting the cathodes 29 and 39 of the firing valves 21 and 23. The negative terminal of the divider 71 is connected to the control electrodes 49 and 51 of the firing valves 21 and 23 in a circuit extending from the negative terminal through four resistors 81, 82, 83, 84 to an adjustable tap 85 on a potentiometer 87 and from the end terminal 89 of the potentiometer through another resistor 91, the conductor 57, and the corresponding grid resistors 53 and 55 to the control electrodes. The potential originally appearing between the intermediate tap 79 on the divider 71 and the negative terminal thereof is sufficient to maintain the firing valves non-conductive regardless of the other potentials in the control circuit.

An electric discharge valve 93, preferably a thyratron, has its anode 95 connected through a push-button switch 97 to the positive terminal of the divider 71. The valve 93 is designated as a "start" valve and its cathode 99 is connected through a rectifier 101, a potentiometer 103, and a capacitor 105 to the negative terminal of the divider 71. The resistor 81 is connected in parallel with the rectifier 101, potentiometer 103, and capacitor 105. Thus, when the start valve 93 is conductive, the terminal of the resistor 81 which is connected to the cathode 99 of the start valve becomes positive with respect to the center tap 79 of the divider 71. As a result, the control electrodes 49 and 51 of the firing valves become less negative with respect to their cathodes 29 and 39.

The control circuit of the start valve 93 may be traced from its grid 107 through a grid resistor 109 and resistors 111 and 82 to the cathode 99. A direct current biasing potential is impressed across the resistor 82 from an auxiliary source 113 and is of such polarity as to tend to maintain the start valve 93 non-conductive. A potential impulse is periodically impressed across the resistor 111 through an impulse transformer 115 energized from the alternating current source 15 through a phase-shifting circuit 117. The phase-shifting circuit 117 is adjusted so that the potential impulse is impressed across the resistor 111 at the beginning of a period of the alternating current source. The potential impulse across the resistor 111 is sufficient to counteract the biasing potential across the resistor 82. Thus, when the push-button switch 97 is closed, the start valve 93 is rendered conductive by the next succeeding potential impulse across the resistor 111.

Current flowing through the start valve 93 charges the capacitor 105 at a rate determined by the setting of the potentiometer 103 in series therewith. The capacitor 105 is also connected in the control circuit of another electric discharge device 119, preferably a thyratron, which is designated a "stop" valve. The anode 121 of the stop valve 119 is also connected to the positive terminal of the divider 71 through the push-button switch 97. The cathode 123 of the stop valve is connected to another intermediate tap 125 on the divider 71.

The control circuit of the stop valve 119 may then be traced from the grid 127 through the grid resistor 131, the capacitor 105 to the negative terminal of divider 71 and from the intermediate tap 125 to the cathode 123. The potential appearing between the intermediate tap 125 and the negative terminal of the divider 71 normally maintains the stop valve non-conductive. However, a predetermined interval of time after the start valve 93 becomes conductive, as determined by the setting of the potentiometer 103, the potential across the capacitor 105 rises to a value sufficient to counteract the biasing potential in the control circuit of the stop valve 119 to render it conductive. Upon the stop valve 119 becoming conductive, the intermediate tap 125 is connected through the stop valve to the positive terminal of the divider and the intermediate tap 79 connected to the cathodes 29 and 39 of the firing valves again becomes positive with respect to the control electrodes 49 and 51. The start and stop valve circuits are explained in detail in Patent No. 2,220,151 issued to Finn H. Gulliksen on November 5, 1940 and assigned to the assignee of the present invention.

A second phase shifting circuit 133 is energized from the alternating-current source 15 by an auxiliary transformer 135. A reactance 137 and a resistor 139 are connected in series across the end terminals of the secondary 141 of the transformer 135. The reactance 137 and the resistor 139 both have an intermediate tap 143 and 145, respectively. A heat control potentiometer 147, another resistor 149, and a variable resistor 151 are connected in series between the intermediate tap 145 on the resistor 139 and the intermediate tap 143 on the reactance 137. A full-wave rectifier unit 153 has one of its input terminals 155 connected to a center tap 157 on the secondary 141, and the other input terminal 159 connected to the adjustable tap 161 of the potentiometer 147. The output terminals of the rectifier 153 are connected across the third resistor 83 in the circuit between the negative terminal of the divider 71 and the control electrodes 49 and 51 of the firing valves.

Thus, a potential is impressed across the third resistor 83 which has the wave form of a full wave rectified alternating potential inverted with respect to the control electrodes 49 and 51 and displaced in phase relative to the source potential. The amount of phase displacement is determined by the position of the adjustable tap 161 on the potentiometer 147 and the setting of the variable resistor 151. A scale 163 is provided alongside the variable resistor 151 to permit setting thereof in accordance with the power factor of the load. Another scale 165 is provided alongside the potentiometer 147 to permit setting of the adjustable tap 161 thereof in accordance with the welding heat desired.

Another auxiliary transformer 167 has its primary 169 connected between an end terminal of the potentiometer 147 connected to tap 145 on resistor 139 and the adjustable tap 161 of the potentiometer. The potential appearing across the secondary 171 of the auxiliary transformer is rectified and filtered by a rectifier unit 173 and impressed across the fourth resistor 84 in the circuit between the negative terminal of the divider 71 and the control electrodes 49 and 51 of the firing valves. The potential across the fourth resistor 84, therefore, is a direct current potential which varies in accordance with the setting of the heat control potentiometer 147. It is to be noted that for the same heat control setting of potentiometer 147, different potentials appear across the fourth resistor 84 for different settings of the variable resistor 151 in series with the heat control potentiometer.

The fourth resistor 91 and the potentiometer 87 in the control circuit of the firing valves are also part of a voltage compensating circuit 172. A vacuum discharged device 174 and resistor 91 are connected in series across the end terminals of the potentiometer 87. A substantially constant direct current potential is impressed across the potentiometer 87 which is derived from the alternating source 15 through a voltage regulator 178, an auxiliary transformer 179, a rectifier 181 and several filtering elements 183, 185, 187 and 189. The voltage regulator 178 shown in the drawings is the well-known type manufactured by the Raytheon Manufacturing Company, although any suitable regulator may be used. The purpose of the regulator is to prevent the potential across potentiometer 87 from varying with fluctuations in the source.

The vacuum device 174 is of the type whose resistivity varies in accordance with variations in the magnitude of the potential impressed between its grid 175 and cathode 177, an R. C. A. 2A3 tube being satisfactory. The grid 175 is connected through a grid resistor 191 to an intermediate tap 193 on another voltage divider 195 whose positive terminal is connected to the cathode 177. A direct current potential is also impressed across the second voltage divider 195 but its magnitude varies with variations in the magnitude of the alternating source potential. The potential across the second divider 195 is derived from a three-phase rectifying system 197 energized from the source 15 through a pair of auxiliary transformers 199 and 201. The primary and secondary windings of the transformers 199 and 201 are connected in a well-known manner to deliver three-phase alternating potential to the rectifying system. A small filter capacitor 203 is connected across divider 195 so that the resultant potential appearing between the grid and cathode of device 174 is only varied to any appreciable degree when the effective value of the source potential varies.

As the grid-cathode potential of the vacuum discharge device 174 increases, the resistivity of the device to the flow of current increases. The current flowing through the resistor 91 in series with the device 174 then decreases as does the potential developed thereacross by that current. It is then apparent that the potential across the resistor 91 varies in accordance with the potential across potentiometer 195 and, therefore, in accordance with the source potential. However, because of the amplification effected through device 174 a slight change in the effective value of the source potential produces a comparatively large change in the direct current potential on resistor 91. The polarity of the potential across resistor 91 tends to make the control electrodes 49 and 51 of the firing valves positive. However, it is to be noted that an increase in the source potential acts through resistor 91 to make the control electrodes less positive and a decrease in the source potential makes the control electrodes more positive.

The operation of the apparatus may be more readily understood by reference to Figs. 2 and 3 with respect to the circuit of Fig. 1. In Fig. 3, the anode potential of one firing valve is shown by the dotted curve 204, and the anode potential of the other firing valve is shown by the solid line curve 205.

Originally the control potential for the firing valves is represented by curve 207. To initiate a welding operation, the push-button switch 97 is closed manually. The start valve 93 then becomes conductive when the next potential impulse is impressed across the resistor 111 in its control circuit. When the start valve 93 becomes conductive, the sum of the continuous potentials in the control circuit of the firing valves becomes less negative. As a result, the control potential is raised to the position shown as curve 207'. In this position, the control potential curve 207' rises above the critical potential of the first firing valve, which for the purposes of simplicity is assumed to be zero, at a point 209 in each half period of the source in which the anode of the first firing valve is positive. Likewise the control potential rises above the critical potential of the second firing valve at a point 211 in each half period of the source in which the anode of the second firing valve is positive. As each firing valve becomes conductive, the corresponding ignitron becomes conductive to conduct current to the welding transformer.

The phase position of the points 209 and 211 is the same with respect to the corresponding half-period and is determined by the setting of the variable resistor 151 and the heat control potentiometer 147 of the phase shifting circuit 133. The variable resistor 151 is set in accordance with the power factor of the load so that for a 100% heat setting of the potentiometer 147, the firing valves are rendered conductive at the beginning of the positive half-period of the current regardless of the power factor. The potentiometer 147 may, of course, be set for different heats, each of which is a given percentage of the available current.

In Fig. 2, the anode potential of one of the firing valves is represented by a solid line curve 213. Let it be assumed that the power factor is 100% so that the current curve tends to follow the source potential curve. Then for a given heat setting, which may be high, the control potential may be represented by another solid line curve 215. Assuming that the critical potential of the firing valve is zero, the control potential causes the valve to be rendered conductive at the point 216. Should the source potential decrease, as represented by the dotted line curve 213a, the circuit 172 increases the direct-current component of the control potential by an amount illustrated as 217. Consequently, the control potential is raised to the position represented by the second dotted line curve 215a and the valve becomes conductive at point 221. Because of the slope of the wave front of the control potential curve, the firing point of a firing valve is advanced by an amount represented by 223. Of course, if the source potential should increase, the control potential curve would be lowered so that the firing point of the valve would be delayed by an amount necessary to compensate for the reduced potential.

If the heat setting is then changed to a position corresponding to 20% heat with the anode potential represented by curve 213, the direct-current component of the control potential is lowered by an amount illustrated by 225, and at the same time the phase position of the pulsating component is shifted to the right. As a result, the control potential now assumes the position represented by curve 215b. It is to be noted that with the same power factor setting, but with various heat settings, the peak of the control potential curve will follow along the line 227.

With the 20% heat setting, the firing valve is rendered conductive at the point 229. Should the source potential decrease to the position of the dotted line curve 213a, the control potential is raised by the same amount as in the case of the higher heat setting to curve 215c. However, because the slope of the wave front of the control potential increases with respect to time, the firing point is only advanced from point 229 to point 230 by an amount 231 which is less than the amount of advance 223 of the firing point in the case of the higher heat setting. As previously pointed out, the compensation required with a low heat setting is much less than with a high heat setting, and, consequently, the firing point need not be advanced to the same extent.

If the power factor of the load is not 100% but is something less so that the current assumes the position represented by the dot-dash line 233, the variable resistor 151 is set to correspond with the power factor. Then with the same high heat setting as in the original case, the control potential is represented by curve 215d and rises above the critical potential at the point 235. If the source potential is then lowered to 213a, the control potential is raised to the dotted curve 215e and the firing point is advanced from point 235 to point 237 by an amount 238.

It has been found that regardless of the power factor of the load, a 20% heat may be obtained by rendering the valve conductive at a phase point of 135° shown in Fig. 2 as point 229. Consequently, the lower end of the potentiometer 147 is always employed for the 20% heat setting, and the line representing the positions of the control potential peaks for various heat settings with normal source potential always passes through the point 239. In other words, changing the power factor setting of the variable resistor 151 selects the angle of the line of peaks and changing the heat setting of the potentiometer selects the particular point along the line of peaks at which the control potential peak is to be located. In this manner, a variation in source potential is compensated by a variation in the position of the firing point with due regard to the power factor and heat control setting. Thus, in the present case, the line of peaks falls along line 241.

A predetermined time interval after the firing of the start valve 93, the capacitor 105 in the control circuit of the stop valve 119 becomes charged sufficiently to render the stop valve conductive. When the stop valve becomes conductive, the sum of the continuous potentials in the control circuit of the firing valves again becomes highly negative to prevent the control potential curve from rising above the critical potential of the valve. Thus, further conductivity by the ignitrons 17 and 19 is prevented. The push-button switch 97 may then be released, whereupon a back contactor 243 thereon is closed to complete a discharge circuit for the capacitor 105. Another welding operation may thereafter be initiated by reclosing the push-button switch 97.

Although I have shown and described a specific embodiment of my invention, I am fully aware that many modifications thereof are possible without departing from the spirit of the invention. My invention, therefore, is not intended to be restricted to the specific embodiment shown.

I claim as my invention:

1. For use in controlling the supply of current from a source of alternating potential to a load, the combination comprising electric valve means of the arc-like type interposed in circuit between said source and load, and control means for rendering said valve means conductive in successive half-periods of said source potential including manually adjustable means for preselecting the instant in a half-period at which said valve means is normally rendered conductive, means for varying said instant in a half-period in accordance with variations in the effective value of said source potential, and means for varying the ratio of the variation of said instant to the source potential variation in accordance with the adjustment of said preselecting means and with the power factor of said load.

2. For use in controlling the supply of current from a source of alternating potential to a load, the combination comprising electric valve means of the arc-like type interposed in circuit between said source and load, and control means for rendering said valve means conductive in successive half-periods of said source potential including manually adjustable means for preselecting the instant in a half-period at which said valve means is normally rendered conductive, means for varying said instant in a half-period in accordance with variations in the effective value of said source potential, means for varying the ratio of the variation of said instant to the source potential variation in accordance with the adjustment of said preselecting means with said ratio increasing for adjustments of said preselecting means from a setting for an instant late in a half-period toward a setting for an instant early in a half-period, and means for adjusting the rate of increase of said ratio for loads having different power factors.

3. For use in controlling the supply of current from a source of periodically pulsating potential to a load, the combination comprising electric valve means of the arc-like type interposed in circuit between said source and load, control means for said valve means, said valve means being adapted to be rendered conductive in a period of said source potential upon the application to said control means of a potential greater than a predetermined critical value, means for applying to said control means a second periodically pulsating control potential of the same periodicity but having a preselected phase displacement relative to said source potential, each of the pulsations of said second potential having a sloping wave front with a slope which is non-uniform over the length of said front, means for applying to said control means a third direct-current control potential of a magnitude depending upon the particular phase displacement selected, and means for also applying to said control means a fourth direct-current control potential which varies in magnitude in accordance with variations in the effective value of said source potential.

4. For use in controlling the supply of current from a source of periodically pulsating potential to a load, the combination comprising electric valve means of the arc-like type interposed in circuit between said source and load, control means for said valve means, said valve means being adapted to be rendered conductive in a period of said source potential upon the application to said control means of a potential greater than a predetermined critical value, means for applying to said control means a second periodically pulsating control potential of the same periodicity but having a preselected phase displacement relative to said source potential, each of the pulsations of said second potential having a sloping wave front with the degree of slope with respect to time increasing over the length of said front, means for applying to said control means a third direct-current control potential of a magnitude depending upon the particular phase displacement selected, and means for also applying to said control means a fourth direct-current control potential which varies in magnitude in accordance with variations in the effective value of said source potential.

5. For use in controlling the supply of current from a source of alternating potential to a load, the combination comprising electric valve means of the arc-like type interposed in circuit between said source and load, control means for said valve means, said valve means being adapted to be rendered conductive in a half-period of said source potential upon the application to said control means of a potential greater than a predetermined critical value, means for applying to said control means a second control potential having the wave form of an inverted, full-wave rectified, alternating potential of the same frequency but having a preselected phase displacement relative to said source potential, means for applying to said control means a third direct-current control potential which varies with variations in the effective value of said source potential, and means for also applying to said control means a fourth direct current control potential of a magnitude dependent upon the particular phase displacement selected.

6. For use in controlling the supply of current from a source of periodically pulsating potential to a load, the combination comprising electric valve means of the arc-like type interposed in circuit between said source and load, control means for said valve means, said valve means being adapted to be rendered conductive in a period of said source potential upon the application to said control means of a potential greater than a predetermined critical value, means for applying to said control means a second periodically pulsating control potential of the same periodicity but having a preselected phase displacement relative to said source potential, each of the pulsations of said second potential having a sloping wave front with the degree of slope with respect to time increasing over the length of said front, means for applying to said control means a third direct-current control potential of a magnitude determined by the particular phase displacement selected with the magnitude decreasing with an increase in displacement, and means for also applying to said control means a fourth direct-current control potential which varies in magnitude in accordance with variations in the effective value of said source potential.

7. For use in controlling the supply of current from a source of periodically pulsating potential to a load, the combination comprising electric valve means of the arc-like type interposed in circuit between said source and load, control means for said valve means, said valve means being adapted to be rendered conductive in a period of said source potential upon the application to said control means of a potential greater than a predetermined critical value, means for applying to said control means a second periodically pulsating control potential of the same periodicity but having a preselected phase displacement relative to said source potential, each of the pulsations of said second potential having a sloping wave front with a slope which is non-uniform over the length of said front, means for applying to said control means a third direct-current control potential including means for adjusting the magnitude thereof in accordance with both the power factor of the load and the particular phase displacement selected, and means for also applying to said control means a fourth direct-current control potential which varies in magnitude in accordance with variations in the effective value of said source potential.

8. For use in controlling the supply of current from a source of alternating potential to a load, the combination comprising electric valve means of the arc-like type interposed in circuit between said source and load, control means for said valve means, said valve means being adapted to be rendered conductive in a half-period of said source potential upon the application of said control means of a potential greater than a predetermined critical value, means for applying to said control means a second control potential having the wave form of an inverted, full-wave rectified, alternating potential of the same frequency but having a preselected phase displacement relative to said source potential, means for applying to said control means a third direct-current control potential which varies with variations in the effective value of said source potential, and means for also applying to said control means a fourth direct-current potential including means for adjusting the magnitude thereof in accordance with both the power factor of the load and the particular phase displacement selected.

9. For use in controlling the supply of current from a source of periodically-pulsating potential to a load, the combination comprising electric valve means of the arc-like type interposed in circuit between said source and load, control means for said valve means, said valve means being adapted to be rendered conductive in a period of said source potential upon the application to said control means of a potential greater than a predetermined critical value, means for applying to said control means a second periodically pulsating control potential of the same periodicity but having a preselected phase displacement relative to said source potential, each of the pulsations of said second potential having a sloping wave front with the degree of slope with respect to time increasing over the length of said front, means for applying to said control means a third direct-current control potential including means for adjusting the magnitude thereof in accordance with both the power factor of the load and the particular phase displacement selected with the magnitude increasing with an increase in power factor and decreasing with an increase in phase displacement, and means for also applying to said control means a fourth direct current control potential which varies in magnitude in accordance with variations in the effective value of said source potential.

10. For use in controlling the supply of current from a source of alternating potential to a load, the combination comprising electric valve means of the arc-like type interposed in circuit between said source and load, and control means for rendering said valve means conductive in successive half-periods of said source potential including manually adjustable means for preselecting the instant in a half-period at which said valve means is normally rendered conductive, means for varying said instant in a half-period in accordance with variations in the effective value of said source potential, and means responsive to adjustment of said preselecting means for varying the ratio of the variation of said instant to the source potential variation in accordance with such adjustment and with the power factor of said load.

JOHN R. MAHONEY.